C. L. CARTER.
Harvester Rake.
No. 54,294.
Patented May 1, 1866.
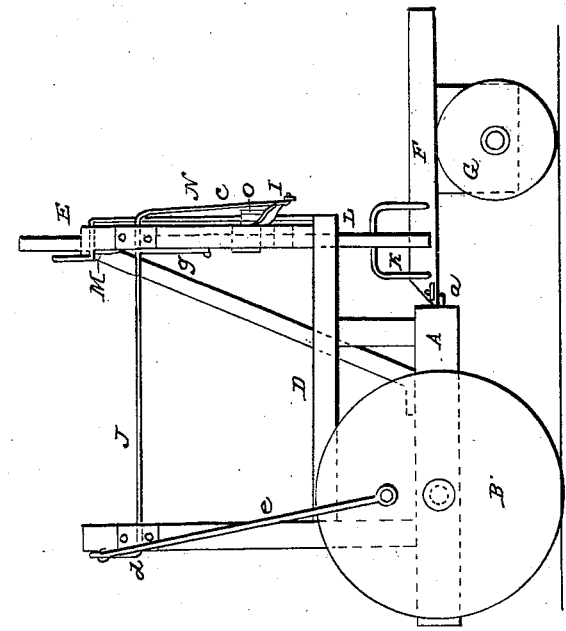
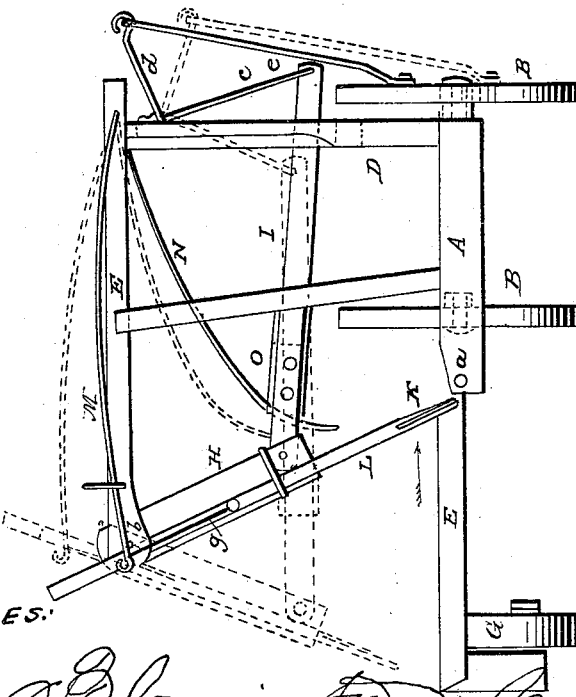
WITNESSES:
INVENTOR.

UNITED STATES PATENT OFFICE.

C. L. CARTER, OF UNION CITY, INDIANA.

IMPROVEMENT IN HARVESTER-RAKES.

Specification forming part of Letters Patent No. 54,294, dated May 1, 1866.

*To all whom it may concern:*

Be it known that I, C. L. CARTER, of Union City, in the county of Randolph and State of Indiana, have invented a new and Improved Raking Device for Harvesters; and I do hereby declare that the following is a full, clear, and exact description thereof, which will enable those skilled in the art to make and use the same, reference being had to the accompanying drawings, forming part of this specification, in which—

Figure 1 is a front view of a harvester with my invention applied to it; Fig. 2, a side view of the same.

Similar letters of reference indicate corresponding parts.

The object of this invention is to obtain a simple automatic raking attachment for harvesters; and it consists in hanging or suspending a rake over the platform of a harvester and operating the same in the manner substantially as hereinafter set forth, whereby the draft of the harvester will not be materially increased and the work performed in a very efficient manner.

A represents the main frame of a harvester, supported by two wheels, B B', and having the draft-pole C attached, as usual.

D is an upright frame attached to the left side of the main frame A, extending some distance behind it, and having a horizontal bar, E, attached to its upper end, said bar E being parallel with the rear end of the frame A and some distance above the latter.

F represents the platform, to the front edge of which the finger-bar is attached, as usual. This platform extends behind the frame A, at the right side thereof, and is connected to said frame by joints *a* in such a manner that the platform, finger-bar, and sickle, which works on the finger-bar, as usual, may rise and fall to conform to the inequalities of the surface of the ground over which they may pass. The outer or grain side of the platform F is supported by a wheel, G, which may be placed either at the side or behind the platform.

In the outer end of the bar E there is secured, by a pivot, *b*, a pendent bar, H, the lower end of which is connected by a bar, I, with the lower end of a crank, *c*, at the rear of a horizontal shaft, J, the bearings of which are secured to the upper part of the frame D.

At the front end of the shaft J there is a crank, *d*, which is at right angles with the crank *c*, and is connected, by a rod, *e*, with one of the wheels B' of the machine.

By this arrangement it will be seen that as the machine is drawn along an oscillating movement will be communicated to the pendent bar H from the wheel B B'. The bar E is of such a length that the pendent bar H will operate directly over the platform F.

K represents a rake, which is attached to the lower end of a bar, F, the latter being fitted in a groove in the front side of the bar H, so that it may slide freely up and down therein.

The bar L is connected, by a cord or chain, *g*, with an arm, M, which is bent to form a journal, the latter passing at right angles through the bar E, and having an arm, N, at the rear of bar E, which projects downward in an inclined position, is slightly curved at its lower end, and is acted upon by a projection, O, attached to the rear side of the bar I.

The arms M N and the projection O on bar I operate the rake K, or give it its rising-and-falling movement, and the oscilating bar H gives the rake its horizontal movement. When the rake moves in the direction of arrow 1 over the platform F the cut grain is raked therefrom, and the arm N is off from the projection O, and hence is retained in a downward or working position by virtue of its own gravity. At the termination of this working movement of the rake the projection O will have been brought back to the rear or inner side of the lower curved end of the arm N; and as the bar I is moved in an opposite direction and the rake made to pass to the outer side of the platform, the projection O acts against the lower end of the arm N and raises it, the latter raising the arm M, and consequently the bar L and rake K. This elevation of the rake K during its movement to the outer side of the platform prevents the rake interfering with the falling of the cut grain upon the platform, and as soon as the rake reaches the termination of this movement the rear end of projection O passes the lower end of the arm N, and the rake drops by its own gravity, so as to rake the grain from the inner side of the platform, the projection O being of wedge or taper shape, so that it may force outward the arm N and pass to the rear or inner side of its lower end, the arm N springing back, so that its lower end will be in line with O as soon as the outer end of O passes the lower end of N.

Thus by this simple means a very efficient automatic raking device for harvesters is obtained, and one which may be operated with but little power, so that the draft of the machine will not be materially increased.

Having thus described my invention, I claim as new and desire to secure by Letters Patent—

1. The arrangement of the pendent bar H, bar I, bar E, crank $c$, shaft J, crank $d$, rod $e$, and wheel B′, operating in the manner and for the purpose herein specified.

2. The arrangement of the bar I and N, bar E, arm M, cord $g$, pendent bar H, bar L, and rake K, constructed and operating in the manner and for the purpose herein specified.

C. L. CARTER.

Witnesses:
JOHN COMMONS,
JOSEPH A. BUNCH.